United States Patent
Tian et al.

(10) Patent No.: US 12,401,805 B2
(45) Date of Patent: Aug. 26, 2025

(54) UV COORDINATE RANGES AND TEXTURE MAP SIZE

(71) Applicant: Tencent America LLC, Palo Alto, CA (US)

(72) Inventors: Jun Tian, Belle Mead, NJ (US); Xiaozhong Xu, State College, PA (US); Chao Huang, Palo Alto, CA (US); Xiang Zhang, Sunnyvale, CA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 18/208,152

(22) Filed: Jun. 9, 2023

(65) Prior Publication Data
US 2024/0073433 A1 Feb. 29, 2024

Related U.S. Application Data

(60) Provisional application No. 63/400,361, filed on Aug. 23, 2022.

(51) Int. Cl.
*H04N 19/186* (2014.01)
*H04N 19/176* (2014.01)
*H04N 19/70* (2014.01)

(52) U.S. Cl.
CPC ......... *H04N 19/186* (2014.11); *H04N 19/176* (2014.11); *H04N 19/70* (2014.11)

(58) Field of Classification Search
None
See application file for complete search history.

(56) References Cited

U.S. PATENT DOCUMENTS

2024/0346701 A1* 10/2024 Kuma ................... G06T 17/20

FOREIGN PATENT DOCUMENTS

| JP | 2000-358192 A | 12/2000 |
| JP | 2002-517851 A | 6/2002 |
| JP | 2020-513703 A | 5/2020 |

OTHER PUBLICATIONS

"[V-CG] Apple's Dynamic Mesh Coding CfP Response", Khaled Mammou, Jungsun Kim, Alexandros Tourapis, Dimitri Podborski, Krasimir Kolarov, ISO/IEC JTC1/SC29/WG7 m59281, Online, Apr. 2022, pp. 1-24.

(Continued)

*Primary Examiner* — Lindsay J Uhl
(74) *Attorney, Agent, or Firm* — ARENTFOX SCHIFF LLP

(57) ABSTRACT

Coding information of a mesh is received. The coding information includes a plurality of first coordinates and a plurality of second coordinates corresponding to a plurality of vertices and a texture map that are associated with the mesh. A respective first coordinate and a respective second coordinate associated with each of the plurality of vertices are normalized by adjusting the respective first coordinate based on a first factor and the respective second coordinate based on a second factor. The first factor and the second factor are associated with at least one of (i) a bit depth value indicating a coded range of the first coordinates and the second coordinates and (ii) a size of the texture map. The normalized respective first coordinate and the normalized respective second coordinate are expanded based on the first factor and the second factor respectively.

20 Claims, 6 Drawing Sheets

(56) References Cited

OTHER PUBLICATIONS

"[V-DMC][EE4.2] Final report", Julien Ricard, Danillo Graziosi, Olivier Mocquard, ISO/IEC JTC1/SC29/WG7 m60584, Online, Jul. 2022, pp. 1-7.
Office Action received for Japanese Patent Application No. 2024-547908, mailed on Jul. 1, 2025, 11 pages (5 pages of English Translation and 6 pages of Original Document).

* cited by examiner

UV COORDINATE RANGES AND TEXTURE MAP SIZE

INCORPORATION BY REFERENCE

The present application claims the benefit of priority to U.S. Provisional Application No. 63/400,361, "On UV Coordinate Ranges and Texture Map Size" filed on Aug. 23, 2022, which is incorporated by reference herein in its entirety.

TECHNICAL FIELD

The present disclosure includes embodiments related to mesh processing.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Advances in three-dimensional (3D) capture, modeling, and rendering have promoted ubiquitous presence of 3D content across various platforms and devices. Nowadays, it is possible to capture a baby's first step in one continent and allow grandparents of the baby to see (and in some cases interact) and enjoy a full immersive experience with the child in another continent. In order to achieve such realism, models are becoming ever more sophisticated, and a significant amount of data is linked to the creation and consumption of those models. 3D meshes are widely used to represent such immersive contents.

SUMMARY

Aspects of the disclosure provide methods and apparatuses for mesh processing. In some examples, an apparatus for mesh processing includes processing circuitry.

According to an aspect of the disclosure, a method of mesh processing performed in a video decoder is provided. In the method, coding information of a mesh that includes a plurality of vertices is received. The coding information includes a plurality of first coordinates and a plurality of second coordinates corresponding to the plurality of vertices and a texture map that is associated with the mesh. The texture map indicates texture information of the mesh. Each vertex of the plurality of vertices includes a respective first coordinate and a respective second coordinate that in combination uniquely identify a position of the each vertex. A respective first coordinate and a respective second coordinate associated with the each vertex are normalized by adjusting the respective first coordinate based on a first factor and the respective second coordinate based on a second factor. The first factor and the second factor are associated with at least one of (i) a bit depth value indicating a coded range of the first coordinates and the second coordinates of the plurality of vertices and (ii) a size of the texture map. The normalized respective first coordinate and the normalized respective second coordinate are expanded based on the first factor and the second factor respectively. The mesh is reconstructed based on the normalized and expanded first coordinates and the normalized and expanded second coordinates of the plurality of vertices of the mesh.

In some embodiments, to normalize the respective first coordinate and the respective second coordinate, each of the first coordinates of the plurality of vertices is divided by a first divider that is included in the first factor. Each of the second coordinates of the plurality of vertices is divided by a second divider that is included in the second factor. To expand the respective first coordinate and the respective second coordinate, each of the normalized first coordinates of the plurality of vertices is further multiplied by a first multiplier that is included in the first factor. Each of the normalized second coordinates of the plurality of vertices is further multiplied by a second multiplier that is included in the second factor.

In an embodiment, the first factor is equal to $(texwidth-1)/(2^{tqP}-1)$. The texwidth is a width of the texture map, and the tqp is the bit depth value that indicates the coded range of the first coordinates and the second coordinates of the plurality of vertices. The second factor is equal to $(texheight-1)/(2^{tqP}-1)$, where the texheight is a height of the texture map.

In an embodiment, the first factor is a first fraction, where each of the first coordinates is normalized by a denominator of the first fraction and expanded by a numerator of the first fraction. The second factor is a second fraction, where each of the second coordinates is normalized by a denominator of the second fraction and expanded by a numerator of the second fraction.

In an embodiment, based on the size of the texture map being unavailable, both the first factor and the second factor are equal to $(2^{tdepth}-1)/(2^{tqP}-1)$. The tdepth is a bit depth value that indicates an initial range of the first coordinates and the second coordinates of the plurality of vertices. The tqp is the bit depth value that indicates the coded range of the first coordinates and the second coordinates of the plurality of vertices.

In an embodiment, the first factor is equal to $(uMax/(2^{tqP}-1))$. The uMax is a first constant, and the tqp is the bit depth value that indicates the coded range of the first coordinates and the second coordinates of the plurality of vertices. The second factor is equal to $(vMax/(2^{tqP}-1))$, where the vMax is a second constant.

In an example, the uMax is equal to is a width of the texture map minus one. The vMax is equal to a height of the texture map minus one.

In an example, based on the size of the texture map being unavailable, both the uMax and the vMax are equal to $2^{tdepth}$ minus one. The tdepth is a bit depth value that indicates an initial range of the first coordinates and the second coordinates of the plurality of vertices.

In an example, both the uMax and the vMax are equal to $2^{tdepth}$ minus one. The tdepth is a bit depth value that indicates an initial range of the first coordinates and the second coordinates of the plurality of vertices.

According to another aspect of the disclosure, an apparatus is provided. The apparatus includes processing circuitry. The processing circuitry can be configured to perform any of the described methods for mesh processing.

Aspects of the disclosure also provide a non-transitory computer-readable medium storing instructions which when executed by a computer cause the computer to perform any of the described methods for mesh processing.

BRIEF DESCRIPTION OF THE DRAWINGS

Further features, the nature, and various advantages of the disclosed subject matter will be more apparent from the following detailed description and the accompanying drawings in which.

DETAILED DESCRIPTION OF EMBODIMENTS

Figure 1:
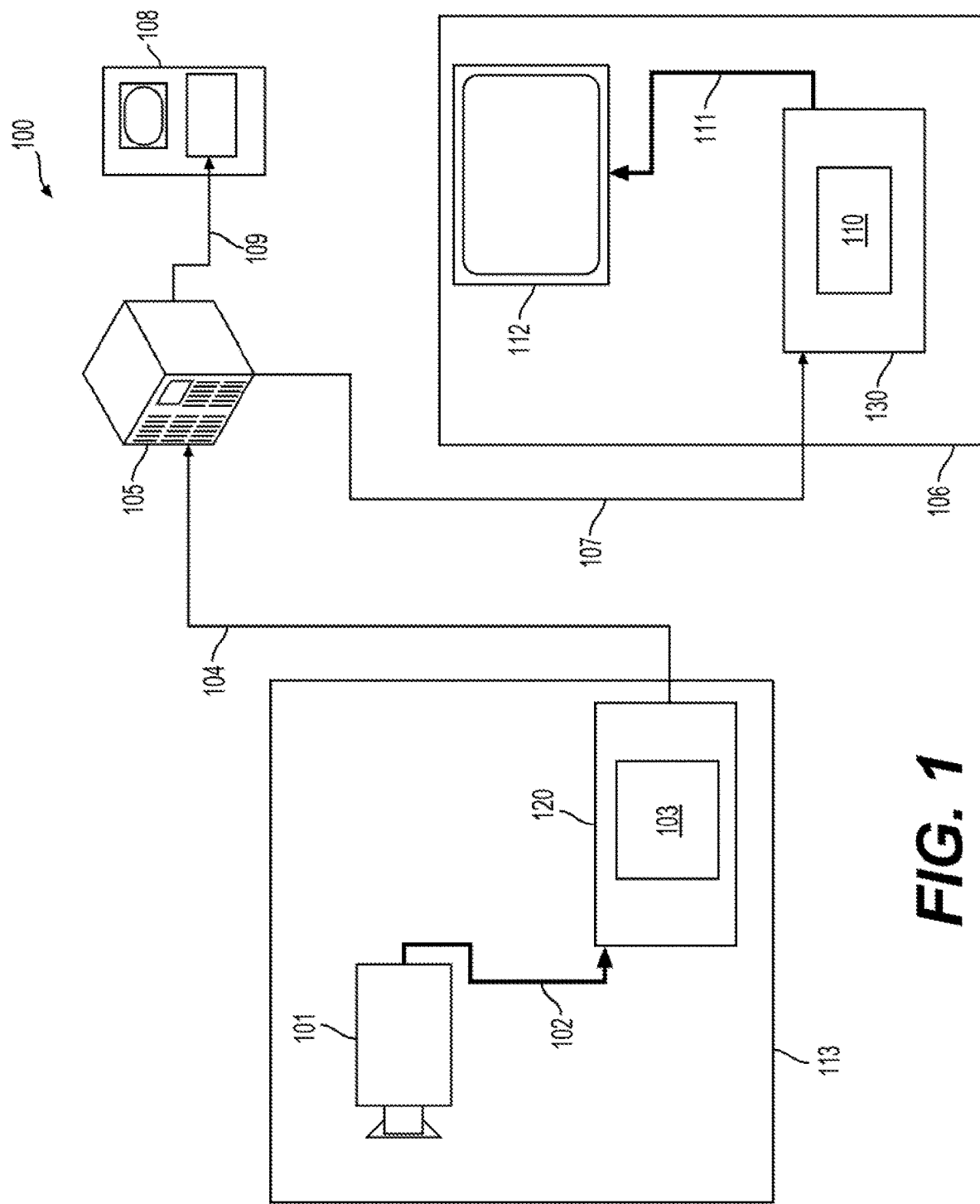
FIG. 1 is a schematic illustration of an exemplary block diagram of a communication system (100).

FIG. 1 shows a block diagram of a video processing system (100) in some examples. The video processing system (100) is an example of an application for the disclosed subject matter, a video encoder and a video decoder in a streaming environment. The disclosed subject matter can be equally applicable to other image and video enabled applications, including, for example, video conferencing, digital TV, streaming services, storing of compressed video on digital media including CD, DVD, memory stick and the like.

The video processing system (100) includes a capture subsystem (113), that can include a video source (101). The video source (101) can include one or more images captured by a camera and/or generated by a computer. For example, a digital camera can create a stream of video pictures (102) that are uncompressed. In an example, the stream of video pictures (102) includes samples that are taken by the digital camera. The stream of video pictures (102), depicted as a bold line to emphasize a high data volume when compared to encoded video data (104) (or coded video bitstreams), can be processed by an electronic device (120) that includes a video encoder (103) coupled to the video source (101). The video encoder (103) can include hardware, software, or a combination thereof to enable or implement aspects of the disclosed subject matter as described in more detail below. The encoded video data (104) (or encoded video bitstream), depicted as a thin line to emphasize the lower data volume when compared to the stream of video pictures (102), can be stored on a streaming server (105) for future use. One or more streaming client subsystems, such as client subsystems (106) and (108) in FIG. 1 can access the streaming server (105) to retrieve copies (107) and (109) of the encoded video data (104). A client subsystem (106) can include a video decoder (110), for example, in an electronic device (130). The video decoder (110) decodes the incoming copy (107) of the encoded video data and creates an outgoing stream of video pictures (111) that can be rendered on a display (112) (e.g., display screen) or other rendering device (not depicted). In some streaming systems, the encoded video data (104), (107), and (109) (e.g., video bitstreams) can be encoded according to certain video coding/compression standards. Examples of those standards include ITU-T Recommendation H.265. In an example, a video coding standard under development is informally known as Versatile Video Coding (VVC). The disclosed subject matter may be used in the context of VVC.

It is noted that the electronic devices (120) and (130) can include other components (not shown). For example, the electronic device (120) can include a video decoder (not shown) and the electronic device (130) can include a video encoder (not shown) as well.

Figure 2:
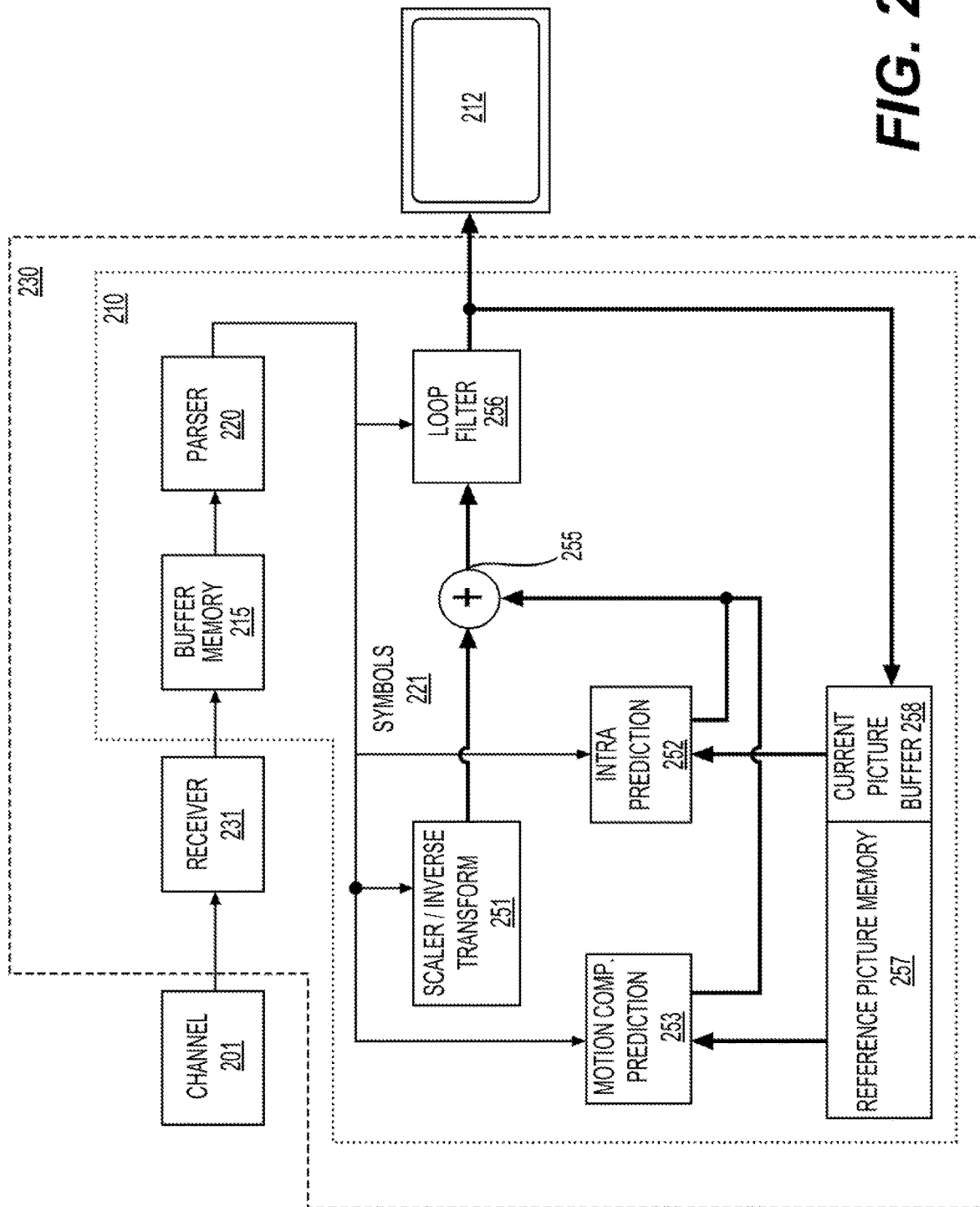
FIG. 2 is a schematic illustration of an exemplary block diagram of a decoder.

FIG. 2 shows an exemplary block diagram of a video decoder (210). The video decoder (210) can be included in an electronic device (230). The electronic device (230) can include a receiver (231). The receiver (231) may include receiving circuitry, such as network interface circuitry. The video decoder (210) can be used in the place of the video decoder (110) in the FIG. 1 example.

The receiver (231) may receive one or more coded video sequences to be decoded by the video decoder (210). In an embodiment, one coded video sequence is received at a time, where the decoding of each coded video sequence is independent from the decoding of other coded video sequences. The coded video sequence may be received from a channel (201), which may be a hardware/software link to a storage device which stores the encoded video data. The receiver (231) may receive the encoded video data with other data, for example, coded audio data and/or ancillary data streams, that may be forwarded to their respective using entities (not depicted). The receiver (231) may separate the coded video sequence from the other data. To combat network jitter, a buffer memory (215) may be coupled in between the receiver (231) and an entropy decoder/parser (220) ("parser (220)" henceforth). In certain applications, the buffer memory (215) is part of the video decoder (210). In others, it can be outside of the video decoder (210) (not depicted). In still others, there can be a buffer memory (not depicted) outside of the video decoder (210), for example to combat network jitter, and in addition another buffer memory (215) inside the video decoder (210), for example to handle playout timing. When the receiver (231) is receiving data from a store/forward device of sufficient bandwidth and controllability, or from an isosynchronous network, the buffer memory (215) may not be needed, or can be small. For use on best effort packet networks such as the Internet, the buffer memory (215) may be required, can be comparatively large and can be advantageously of adaptive size, and may at least partially be implemented in an operating system or similar elements (not depicted) outside of the video decoder (210).

The video decoder (210) may include the parser (220) to reconstruct symbols (221) from the coded video sequence. Categories of those symbols include information used to manage operation of the video decoder (210), and potentially information to control a rendering device such as a render device (212) (e.g., a display screen) that is not an integral part of the electronic device (230) but can be coupled to the electronic device (230), as shown in FIG. 2. The control information for the rendering device(s) may be in the form of Supplemental Enhancement Information (SEI) messages or Video Usability Information (VUI) parameter set fragments (not depicted). The parser (220) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (220) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (220) may also extract from the coded video sequence information such as transform coefficients, quantizer parameter values, motion vectors, and so forth.

The parser (220) may perform an entropy decoding/parsing operation on the video sequence received from the buffer memory (215), so as to create symbols (221).

Reconstruction of the symbols (221) can involve multiple different units depending on the type of the coded video picture or parts thereof (such as: inter and intra picture, inter and intra block), and other factors. Which units are involved, and how, can be controlled by subgroup control information parsed from the coded video sequence by the parser (220). The flow of such subgroup control information between the parser (220) and the multiple units below is not depicted for clarity.

Beyond the functional blocks already mentioned, the video decoder (210) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (251). The scaler/inverse transform unit (251) receives a quantized transform coefficient as well as control information, including which transform to use, block size, quantization factor, quantization scaling matrices, etc. as symbol(s) (221) from the parser (220). The scaler/inverse transform unit (251) can output blocks comprising sample values, that can be input into aggregator (255).

In some cases, the output samples of the scaler/inverse transform unit (251) can pertain to an intra coded block. The intra coded block is a block that is not using predictive information from previously reconstructed pictures, but can use predictive information from previously reconstructed parts of the current picture. Such predictive information can be provided by an intra picture prediction unit (252). In some cases, the intra picture prediction unit (252) generates a block of the same size and shape of the block under reconstruction, using surrounding already reconstructed information fetched from the current picture buffer (258). The current picture buffer (258) buffers, for example, partly reconstructed current picture and/or fully reconstructed current picture. The aggregator (255), in some cases, adds, on a per sample basis, the prediction information the intra prediction unit (252) has generated to the output sample information as provided by the scaler/inverse transform unit (251).

In other cases, the output samples of the scaler/inverse transform unit (251) can pertain to an inter coded, and potentially motion compensated, block. In such a case, a motion compensation prediction unit (253) can access reference picture memory (257) to fetch samples used for prediction. After motion compensating the fetched samples in accordance with the symbols (221) pertaining to the block, these samples can be added by the aggregator (255) to the output of the scaler/inverse transform unit (251) (in this case called the residual samples or residual signal) so as to generate output sample information. The addresses within the reference picture memory (257) from where the motion compensation prediction unit (253) fetches prediction samples can be controlled by motion vectors, available to the motion compensation prediction unit (253) in the form of symbols (221) that can have, for example X, Y, and reference picture components. Motion compensation also can include interpolation of sample values as fetched from the reference picture memory (257) when sub-sample exact motion vectors are in use, motion vector prediction mechanisms, and so forth.

The output samples of the aggregator (255) can be subject to various loop filtering techniques in the loop filter unit (256). Video compression technologies can include in-loop filter technologies that are controlled by parameters included in the coded video sequence (also referred to as coded video bitstream) and made available to the loop filter unit (256) as symbols (221) from the parser (220). Video compression can also be responsive to meta-information obtained during the decoding of previous (in decoding order) parts of the coded picture or coded video sequence, as well as responsive to previously reconstructed and loop-filtered sample values.

The output of the loop filter unit (256) can be a sample stream that can be output to the render device (212) as well as stored in the reference picture memory (257) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (220)), the current picture buffer (258) can become a part of the reference picture memory (257), and a fresh current picture buffer can be reallocated before commencing the reconstruction of the following coded picture.

The video decoder (210) may perform decoding operations according to a predetermined video compression technology or a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (231) may receive additional (redundant) data with the encoded video. The additional data may be included as part of the coded video sequence(s). The additional data may be used by the video decoder (210) to properly decode the data and/or to more accurately reconstruct the original video data. Additional data can be in the form of, for example, temporal, spatial, or signal noise ratio (SNR) enhancement layers, redundant slices, redundant pictures, forward error correction codes, and so on.

Figure 3:
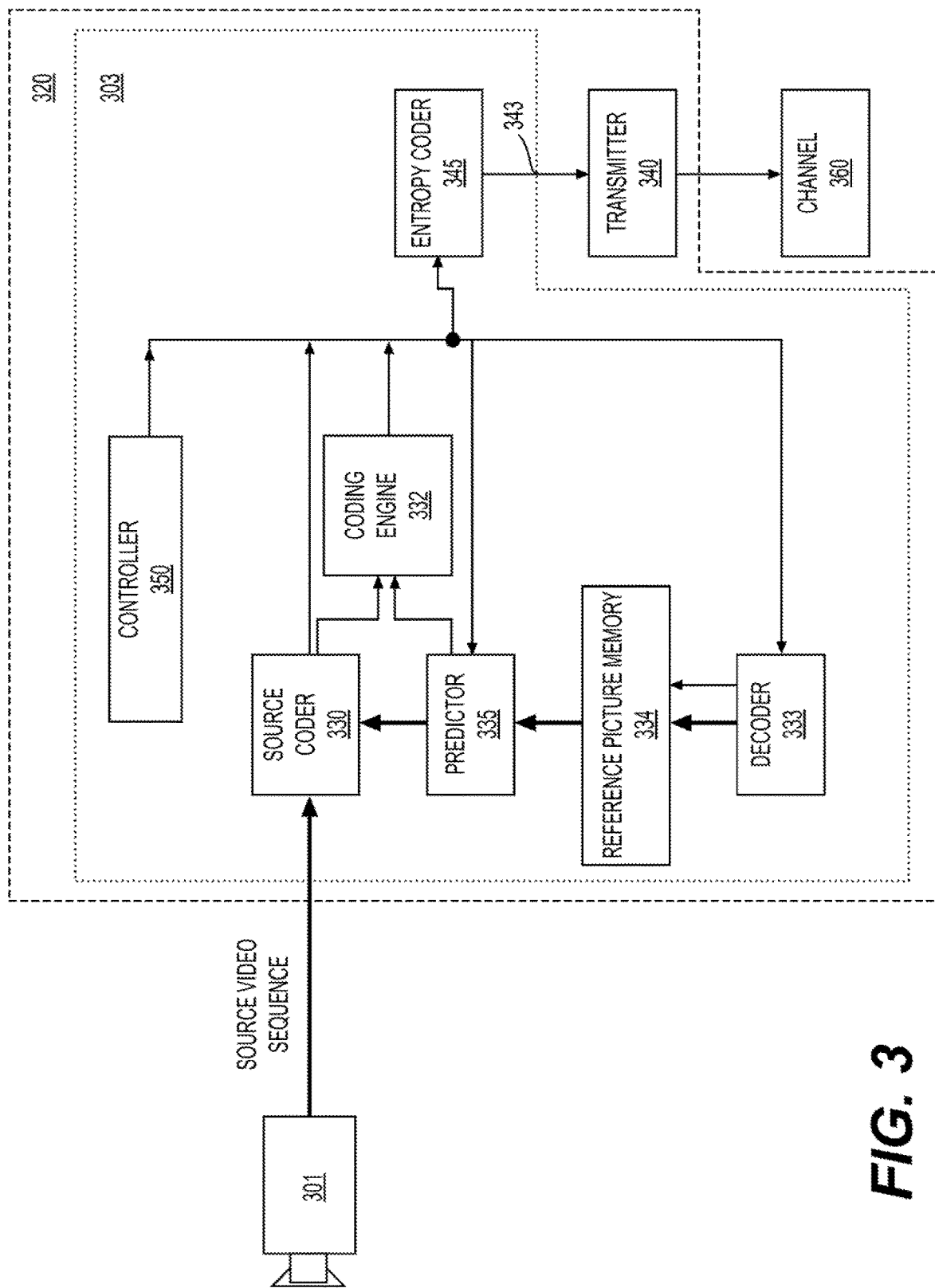
FIG. 3 is a schematic illustration of an exemplary block diagram of an encoder.

FIG. 3 shows an exemplary block diagram of a video encoder (303). The video encoder (303) is included in an electronic device (320). The electronic device (320) includes a transmitter (340) (e.g., transmitting circuitry). The video encoder (303) can be used in the place of the video encoder (103) in the FIG. 1 example.

The video encoder (303) may receive video samples from a video source (301) (that is not part of the electronic device (320) in the FIG. 3 example) that may capture video image(s) to be coded by the video encoder (303). In another example, the video source (301) is a part of the electronic device (320).

The video source (301) may provide the source video sequence to be coded by the video encoder (303) in the form of a digital video sample stream that can be of any suitable bit depth (for example: 8 bit, 10 bit, 12 bit, . . . ), any colorspace (for example, BT.601 Y CrCB, RGB, . . . ), and any suitable sampling structure (for example Y CrCb 4:2:0, Y CrCb 4:4:4). In a media serving system, the video source (301) may be a storage device storing previously prepared video. In a videoconferencing system, the video source (301) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc., in use. The description below focuses on samples.

According to an embodiment, the video encoder (303) may code and compress the pictures of the source video sequence into a coded video sequence (343) in real time or under any other time constraints as required. Enforcing appropriate coding speed is one function of a controller (350). In some embodiments, the controller (350) controls other functional units as described below and is functionally coupled to the other functional units. The coupling is not depicted for clarity. Parameters set by the controller (350) can include rate control related parameters (picture skip, quantizer, lambda value of rate-distortion optimization techniques, . . . ), picture size, group of pictures (GOP) layout, maximum motion vector search range, and so forth. The controller (350) can be configured to have other suitable functions that pertain to the video encoder (303) optimized for a certain system design.

In some embodiments, the video encoder (303) is configured to operate in a coding loop. As an oversimplified description, in an example, the coding loop can include a source coder (330) (e.g., responsible for creating symbols, such as a symbol stream, based on an input picture to be coded, and a reference picture(s)), and a (local) decoder (333) embedded in the video encoder (303). The decoder (333) reconstructs the symbols to create the sample data in a similar manner as a (remote) decoder also would create. The reconstructed sample stream (sample data) is input to the reference picture memory (334). As the decoding of a symbol stream leads to bit-exact results independent of decoder location (local or remote), the content in the reference picture memory (334) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (333) can be the same as of a "remote" decoder, such as the video decoder (210), which has already been described in detail above in conjunction with FIG. 2. Briefly referring also to FIG. 2, however, as symbols are available and encoding/decoding of symbols to a coded video sequence by an entropy coder (345) and the parser (220) can be lossless, the entropy decoding parts of the video decoder (210), including the buffer memory (215), and parser (220) may not be fully implemented in the local decoder (333).

In an embodiment, a decoder technology except the parsing/entropy decoding that is present in a decoder is present, in an identical or a substantially identical functional form, in a corresponding encoder. Accordingly, the disclosed subject matter focuses on decoder operation. The description of encoder technologies can be abbreviated as they are the inverse of the comprehensively described decoder technologies. In certain areas a more detail description is provided below.

During operation, in some examples, the source coder (330) may perform motion compensated predictive coding, which codes an input picture predictively with reference to one or more previously coded picture from the video sequence that were designated as "reference pictures." In this manner, the coding engine (332) codes differences between pixel blocks of an input picture and pixel blocks of reference picture(s) that may be selected as prediction reference(s) to the input picture.

The local video decoder (333) may decode coded video data of pictures that may be designated as reference pictures, based on symbols created by the source coder (330). Operations of the coding engine (332) may advantageously be lossy processes. When the coded video data may be decoded at a video decoder (not shown in FIG. 3), the reconstructed video sequence typically may be a replica of the source video sequence with some errors. The local video decoder (333) replicates decoding processes that may be performed by the video decoder on reference pictures and may cause reconstructed reference pictures to be stored in the reference picture memory (334). In this manner, the video encoder (303) may store copies of reconstructed reference pictures locally that have common content as the reconstructed reference pictures that will be obtained by a far-end video decoder (absent transmission errors).

The predictor (335) may perform prediction searches for the coding engine (332). That is, for a new picture to be coded, the predictor (335) may search the reference picture memory (334) for sample data (as candidate reference pixel blocks) or certain metadata such as reference picture motion vectors, block shapes, and so on, that may serve as an appropriate prediction reference for the new pictures. The predictor (335) may operate on a sample block-by-pixel block basis to find appropriate prediction references. In some cases, as determined by search results obtained by the predictor (335), an input picture may have prediction references drawn from multiple reference pictures stored in the reference picture memory (334).

The controller (350) may manage coding operations of the source coder (330), including, for example, setting of parameters and subgroup parameters used for encoding the video data.

Output of all aforementioned functional units may be subjected to entropy coding in the entropy coder (345). The entropy coder (345) translates the symbols as generated by the various functional units into a coded video sequence, by applying lossless compression to the symbols according to technologies such as Huffman coding, variable length coding, arithmetic coding, and so forth.

The transmitter (340) may buffer the coded video sequence(s) as created by the entropy coder (345) to prepare for transmission via a communication channel (360), which may be a hardware/software link to a storage device which would store the encoded video data. The transmitter (340) may merge coded video data from the video encoder (303)

with other data to be transmitted, for example, coded audio data and/or ancillary data streams (sources not shown).

The controller (350) may manage operation of the video encoder (303). During coding, the controller (350) may assign to each coded picture a certain coded picture type, which may affect the coding techniques that may be applied to the respective picture. For example, pictures often may be assigned as one of the following picture types:

An Intra Picture (I picture) may be one that may be coded and decoded without using any other picture in the sequence as a source of prediction. Some video codecs allow for different types of intra pictures, including, for example Independent Decoder Refresh ("IDR") Pictures. A person skilled in the art is aware of those variants of I pictures and their respective applications and features.

A predictive picture (P picture) may be one that may be coded and decoded using intra prediction or inter prediction using at most one motion vector and reference index to predict the sample values of each block.

A bi-directionally predictive picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (303) may perform coding operations according to a predetermined video coding technology or standard, such as ITU-T Rec. H.265. In its operation, the video encoder (303) may perform various compression operations, including predictive coding operations that exploit temporal and spatial redundancies in the input video sequence. The coded video data, therefore, may conform to a syntax specified by the video coding technology or standard being used.

In an embodiment, the transmitter (340) may transmit additional data with the encoded video. The source coder (330) may include such data as part of the coded video sequence. Additional data may comprise temporal/spatial/SNR enhancement layers, other forms of redundant data such as redundant pictures and slices, SEI messages, VUI parameter set fragments, and so on.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some embodiments, a bi-prediction technique can be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some embodiments of the disclosure, predictions, such as inter-picture predictions and intra-picture predictions, are performed in the unit of blocks, such as a polygon-shaped or triangular block. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an embodiment, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels, and the like.

It is noted that the video encoders (103) and (303), and the video decoders (110) and (210) can be implemented using any suitable technique. In an embodiment, the video encoders (103) and (303) and the video decoders (110) and (210) can be implemented using one or more integrated circuits. In another embodiment, the video encoders (103) and (303), and the video decoders (110) and (210) can be implemented using one or more processors that execute software instructions.

The disclosure includes embodiments related to methods and systems of operating a UV coordinate range and a texture map size.

A mesh can include several polygons that describe a surface of a volumetric object. Each polygon of the mesh can be defined by vertices of the corresponding polygon in a three-dimensional (3D) space and information of how the vertices are connected, which can be referred to as connectivity information. In some embodiments, vertex attributes, such as colors, normals, etc., can be associated with the mesh vertices. Attributes (or vertex attributes) can also be associated with the surface of the mesh by exploiting mapping information that parameterizes the mesh with two-dimensional (2D) attribute maps. Such mapping can usually be described by a set of parametric coordinates, referred to as UV coordinates or texture coordinates, associated with the mesh vertices. 2D attribute maps can be used to store high resolution attribute information such as texture, normals, displacements etc. Such information can be used for various purposes such as texture mapping and shading.

A dynamic mesh sequence may require a large amount of data since the dynamic mesh can include a significant amount of information changing over time. Therefore, efficient compression technologies are required to store and transmit such contents. Mesh compression standards, such as IC, MESHGRID, and FAMC, were previously developed by MPEG to address dynamic meshes with a constant connectivity, a time varying geometry, and vertex attributes. However, these standards may not consider time varying attribute maps and connectivity information. DCC (Digital Content Creation) tools usually generate such dynamic meshes. However, it can be challenging for volumetric acquisition techniques to generate a constant connectivity dynamic mesh, especially under real time constraints. This type of content (e.g., a constant connectivity dynamic mesh) may not be supported by existing standards. MPEG is planning to develop a new mesh compression standard to directly handle dynamic meshes with time varying connectivity information and optionally time varying attribute maps. The new mesh compression standard targets lossy and lossless compression for various applications, such as real-time communications, a storage, a free viewpoint video, Augmented Reality (AR), and Virtual Reality (VR). Functionalities, such as a random access and a scalable/progressive coding, can also be considered.

In UV mapping, each 3D surface can be mapped to a 2D texture. A UV coordinate (e.g., a pair of a U coordinate and a V coordinate) gives a location of a 3D position in a 2D texture map.

In a related video codec, such as MPEG V-Mesh™ v1.0, a source mesh (e.g., an input mesh or an original mesh) can include source positions, source UV coordinates, source connectivity, and a source texture map. The source UV coordinates (or source U and V coordinates) can include a plurality of UV coordinates. Each of the plurality of UV coordinates can include a respective pair of a U coordinate and a V coordinate. A range of the source U and V coordinates can be specified by a value, tdepth, which is a bit depth of the source U and V coordinates. For example, if tdepth=13, then both the source U coordinates and the V coordinates can be in a range of $[0, 2^{13}-1]$, which is [0, 8191]. A source texture map can have a size of swidth and sheight, where swidth is a width of the source texture map and sheight is a height of the source texture map, respectively. For example, if swidth=8192, sheight=8192, then the source texture map can have a size of 8192×8192.

In an encoding process based on a video codec, such as MPEG V-Mesh™ v1.0, U and V coordinates can be encoded using a bit depth value of tqp. Thus, tqp can indicate an encoded range of the U and V coordinates, and tdepth can indicate an original (or initial) range of the U and V coordinates. tqp can be the same as or different from tdepth. In an example, if tqp=10, then both the U coordinates and the V coordinates can be encoded into a range of $[0, 2^{10}-1]$, which is [0, 1023]. A texture map can be encoded into a size of texwidth and texheight. For example, if texwidth=2048, texheight=1536, then the texture map can be encoded with a size of 2048×1536.

Figure 4:
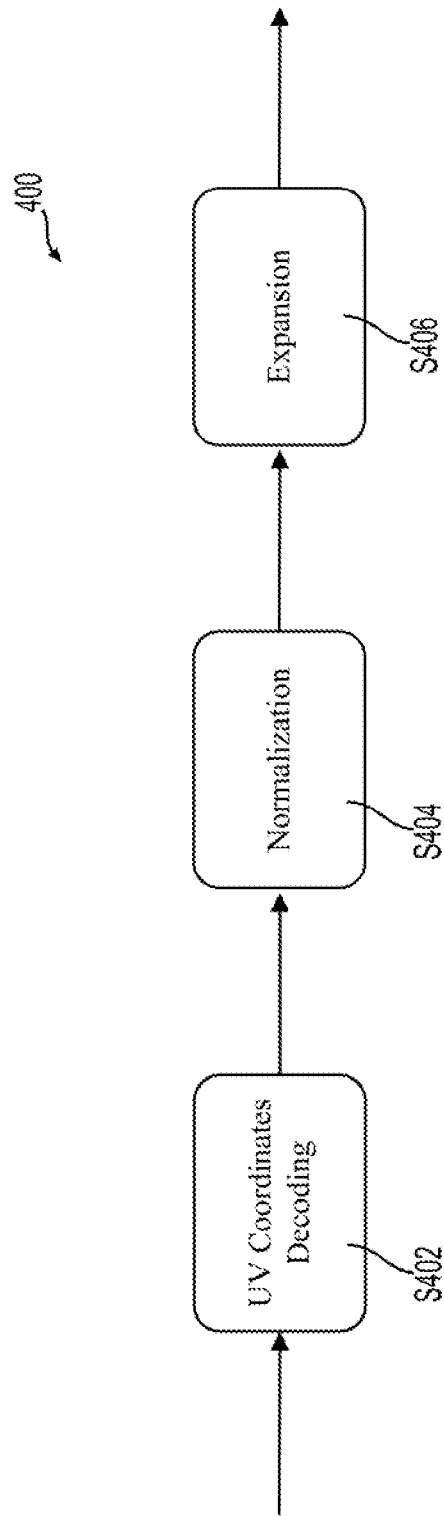
FIG. 4 is a schematic illustration of an exemplary UV coordinate range operation according to some embodiments of the disclosure.

In a decoding process based on a video codec, such as MPEG V-Mesh™ v1.0, the decoded texture map can have a size of texwidth and texheight. For U and V coordinates, after the U coordinates and the V coordinates are decoded into the range of $[0, 2^{tqP}-1]$, the U and V coordinates can receive two conversions, which can be shown in FIG. 4. As shown in FIG. 4, the encoded U and V coordinates can be decoded at step (S402) into the range of $[0, 2^{tqP}-1]$. At step (S404), a first conversion, such as a normalization process, can be applied to the decoded U and V coordinates. In the normalization process, both the U coordinates and the V coordinates can be divided by a first factor, such as $(2^{tqP}-1)$. After the first conversion, both the U coordinates and the V coordinates can have a range of [0, 1]. At step (S406), a second conversion, such as an expansion process, can be applied to the U and V coordinates. In the expansion process, the U coordinates and the V coordinates can be multiplied by a second factor, such as $(2^{tdepth}-1)$. After the second conversion, both the U coordinates and the V coordinates can have a range of $[0, 2^{tdepth}-1]$, which matches the range of the source U and V coordinates.

In the related video codec, such as MPEG V-Mesh™ v1.0, the decoded UV coordinates range and the decoded texture map size may not match. In an example as mentioned above, when tqp=10, texwdith=2048, and texheight=1536, the decoded texture map can have a size of 2048×1536 and the decoded U V coordinates can have a range of 1024×1024. Thus, the size of the decoded texture map is different from the range of the decoded UV coordinates. In addition, the two conversions (e.g., normalization and expansion shown in FIG. 4) applied on the UV coordinates at the decoder side may be unified into one conversion.

In the disclosure, methods and systems are provided to operate (or adjust) a range of UV coordinates and a size of a texture map. The proposed methods can be used separately or combined in any order. Further, each of the methods (or embodiments), encoder, and decoder can be implemented by processing circuitry (e.g., one or more processors or one or more integrated circuits). In an example, the one or more processors execute a program that is stored in a non-transitory computer-readable medium.

A UV coordinate can include a pair of a U coordinate and a V coordinate. The UV coordinate can indicate a location of a 3D position (e.g., a vertex) in a 2D texture map. In the disclosure, UV coordinates can be operated (or adjusted) at a decoder side to match a texture map size. For example, each of the U coordinates can be adjusted based on a first factor and each of the V coordinates can be adjusted based on a second factor. The first factor and the second factor can be predetermined based on at least one of (i) a bit depth value (e.g., tqp) indicating a coded range of the first coordinates and the second coordinates of the plurality of vertices or (ii) a size of the texture map (e.g., texwidth and/or texheight).

In an embodiment, the UV coordinates, which include the U coordinates and the V coordinates, can be expanded based on a decoded texture map size. For example, after the UV coordinates are decoded, both the U coordinates and the V coordinates are in a range of $[0, 2^{tqP}-1]$, where tqp is a bit depth of the UV coordinates during encoding. The UV coordinates can further receive two conversions as follows:

(1) Normalization: a first conversion can be a normalization process. Based on the normalization process, both the U coordinates and the V coordinates can be divided by $(2^{tqP}-1)$. Thus, each of the U coordinates can be divided by $(2^{tqP}-1)$, and each of the V coordinates can be divided by $(2^{tqP}-1)$. After the normalization process is performed, a range of the U coordinates and a range of the V coordinates can be adjusted as [0, 1].

(2) Expansion: a second conversion can be an expansion process. For example, each of the U coordinates can be multiplied by (texwidth−1), and each of the V coordinates can be multiplied by (texheight−1), respectively, where texwidth is a width of the decoded texture map and texheight is a height of the decoded texture map. In an example, texwidth=2048 and texheight=1536. Thus, each of the U coordinates can be multiplied by 2047, and each of the V coordinates can be multiplied by 1535. Accordingly, the range of the U coordinates becomes [0. 2047], the range of the V coordinates becomes [0, 1535], and the range of the UV coordinates becomes 2048×1536, which matches the decoded texture map size, 2048×1536.

In an embodiment, two conversions, such as normalization and expansion, can be combined into a unified conversion. For example, after UV coordinates are decoded, both the U coordinates and the V coordinates are in a range of [0, $2^{tqP}-1$], where tqp is a bit depth of the UV coordinates during encoding. The unified conversion can be applied to the UV coordinates as follows:

Conversion: each of the U coordinates can be multiplied by a scalar of (texwidth−1)/($2_{tqP}-1$), and each of the V coordinates can be multiplied by a scalar of (texheight−1)/($2^{tqP}-1$), where texwidth and texheight are a width and a height of the decoded texture map, respectively. After the conversion, a size of the decoded texture map size can match a range of the decoded UV coordinates.

In an embodiment, a unified conversion can be applied when a texture map size is not available at the decoder side. For example, the texture map size may not be available in an application of texture replacement. In an example, after the UV coordinates are decoded, both the U coordinates and the V coordinates are in a range of [0, $2^{tqP}-1$], where tqp is a bit depth of the UV coordinates during encoding. The unified conversion can be applied as follows:

Conversion: each of the U coordinates can be multiplied by a scalar of ($2^{tdepth}-1$)/($2^{tqP}-1$), and each of the V coordinates can be multiplied by a scalar of ($2^{tdepth}-1$)/($2^{tqP}-1$), where tdepth is a bit depth of source U and V coordinates. After the conversion, both a range of the U coordinates and a range of the V coordinates become [0, $2^{tdepth}-1$].

In an embodiment, a unified conversion can be applied to expand (or adjust) a range of the UV coordinates. In an example, after the UV coordinates are decoded, both the U coordinates and the V coordinates are in a range of [0, $2^{tqP}-1$], where tqp is a bit depth of the UV coordinates during encoding. The range of the UV coordinates can be adjusted based on the unified conversion as follows:

Conversion: each of the U coordinates can be multiplied by a scalar of (uMax/($2^{tqP}-1$)), and each of the V coordinates can be multiplied by a scalar of (vMax/($2^{tqP}-1$)), where uMax and vMax are two values that define the range of the UV coordinates. After the conversion, the U coordinates can be in a range of [0, uMax], and the V coordinates can be in a range of [0, vMax].

In an embodiment, values of uMax and vMax can be adaptively set. For example, the values of uMax and vMax can be predetermined constants.

In an embodiment, the values of uMax and vMax can be set based on a texture map size if the texture map size is available at the decoder side. When a width and a height of the texture map are denoted as texwidth and texheight, respectively, the values of uMax and vMax can be set as uMax=texwidth−1, and vMax=texheight−1.

In an embodiment, values of uMax and vMax can be set based on a source UV coordinate bit depth (e.g., tdepth) if a texture map size is not available at the decoder side. When a bit depth of source U and V coordinates is denoted as Tdepth, the values of uMax and vMax can be set as uMax=$2^{tdepth}-1$, and vMax=$2^{tdepth}-1$.

In an embodiment, values of uMax and vMax can be set based on a source UV coordinate bit depth (e.g., tdepth) regardless of whether a texture map size is available. For example, the values of the uMax and vMax can be set as uMax=$2^{tdepth}-1$, and vMax=$2^{tdepth}-1$, where tdepth indicates a bit depth of source U and V coordinates.

Figure 5:
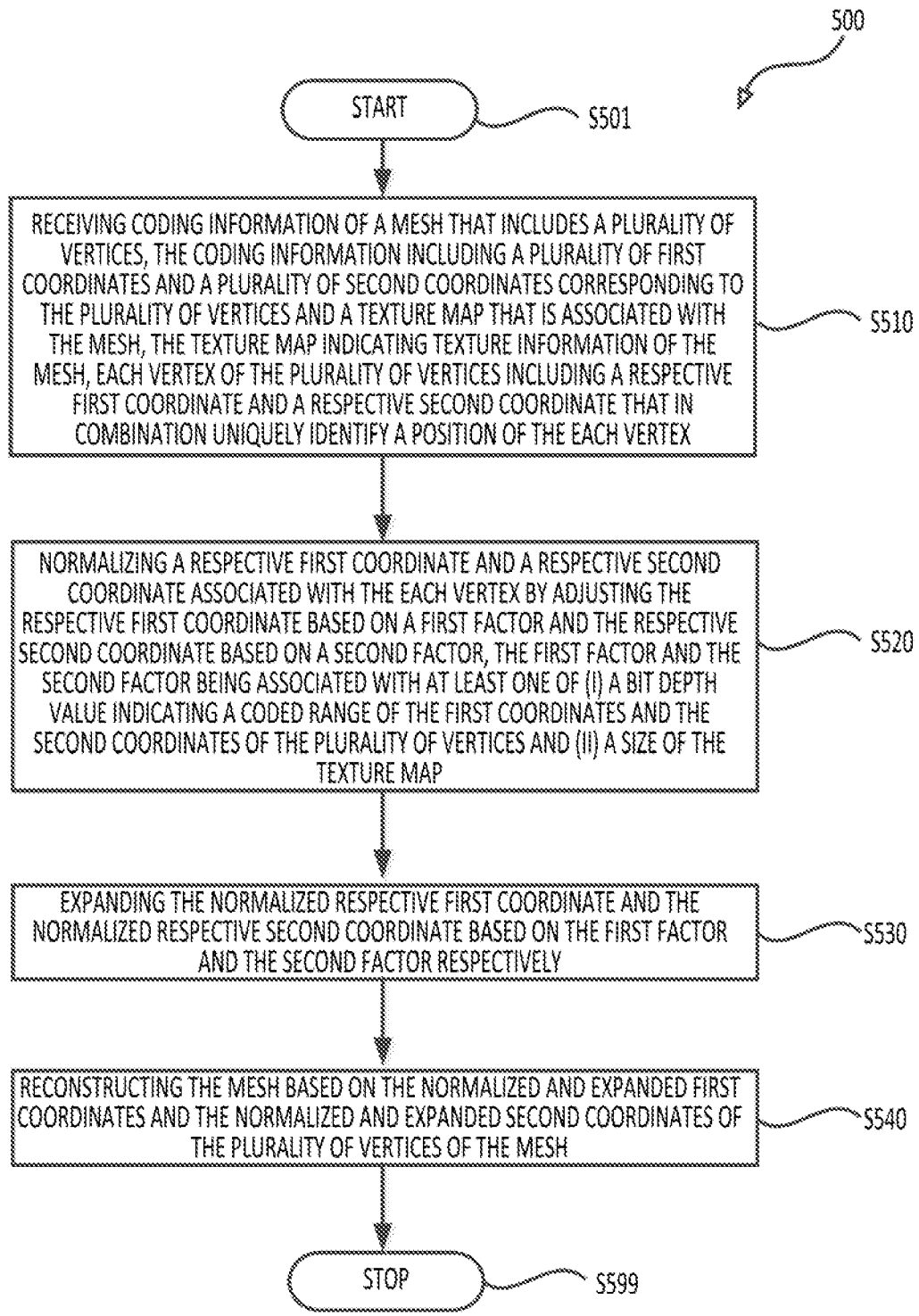
FIG. 5 shows a flow chart outlining a process according to some embodiments of the disclosure.

FIG. 5 shows a flow chart outlining a process (500) according to an embodiment of the disclosure. The process (500) can be used in a decoder, such as a video decoder. In various embodiments, the process (500) is executed by processing circuitry, such as the processing circuitry that performs functions of the video decoder (110), the processing circuitry that performs functions of the video decoder (210), and the like. In some embodiments, the process (500) is implemented in software instructions, thus when the processing circuitry executes the software instructions, the processing circuitry performs the process (500). The process starts at (S501) and proceeds to (S510).

At (S510), coding information of a mesh that includes a plurality of vertices is received. The coding information includes a plurality of first coordinates and a plurality of second coordinates corresponding to the plurality of vertices and a texture map that is associated with the mesh. The texture map indicates texture information of the mesh. Each vertex of the plurality of vertices includes a respective first coordinate and a respective second coordinate that in combination uniquely identify a position of the each vertex.

At (S520), a respective first coordinate and a respective second coordinate associated with the each vertex are normalized by adjusting the respective first coordinate based on a first factor and the respective second coordinate based on a second factor. The first factor and the second factor are associated with at least one of (i) a bit depth value indicating a coded range of the first coordinates and the second coordinates of the plurality of vertices and (ii) a size of the texture map.

At (S720), the normalized respective first coordinate and the normalized respective second coordinate are expanded based on the first factor and the second factor respectively.

At (S730), the mesh is reconstructed based on the normalized and expanded first coordinates and the normalized and expanded second coordinates of the plurality of vertices of the mesh.

In some embodiments, to normalize the respective first coordinate and the respective second coordinate, each of the first coordinates of the plurality of vertices is divided by a first divider that is included in the first factor. Each of the second coordinates of the plurality of vertices is divided by a second divider that is included in the second factor. To expand the respective first coordinate and the respective second coordinate, each of the normalized first coordinates of the plurality of vertices is further multiplied by a first multiplier that is included in the first factor. Each of the normalized second coordinates of the plurality of vertices is further multiplied by a second multiplier that is included in the second factor.

In an embodiment, the first factor is equal to (texwidth−1)/($2^{tqP}-1$). The texwidth is a width of the texture map, and the tqp is the bit depth value that indicates the coded range of the first coordinates and the second coordinates of the plurality of vertices. The second factor is equal to (texheight−1)/($2^{tqP}$−1), where the texheight is a height of the texture map.

In an embodiment, the first factor is a first fraction, where each of the first coordinates is normalized by a denominator of the first fraction and expanded by a numerator of the first fraction. The second factor is a second fraction, where each of the second coordinates is normalized by a denominator of the second fraction and expanded by a numerator of the second fraction.

In an embodiment, based on the size of the texture map being unavailable, both the first factor and the second factor are equal to ($2^{tdepth}$−1)/($2^{tqP}$−1). The tdepth is a bit depth value that indicates an initial range of the first coordinates and the second coordinates of the plurality of vertices. The tqp is the bit depth value that indicates the coded range of the first coordinates and the second coordinates of the plurality of vertices.

In an embodiment, the first factor is equal to (uMax/($2^{tqP}$−1)). The uMax is a first constant, and the tqp is the bit depth value that indicates the coded range of the first coordinates and the second coordinates of the plurality of vertices. The second factor is equal to (vMax/($2^{tqP}$−1)), where the vMax is a second constant.

In an example, the uMax is equal to is a width of the texture map minus one. The vMax is equal to a height of the texture map minus one.

In an example, based on the size of the texture map being unavailable, both the uMax and the vMax are equal to $2^{tdepth}$ minus one. The tdepth is a bit depth value that indicates an initial range of the first coordinates and the second coordinates of the plurality of vertices.

In an example, both the uMax and the vMax are equal to $2^{tdepth}$ minus one. The tdepth is a bit depth value that indicates an initial range of the first coordinates and the second coordinates of the plurality of vertices.

Then, the process proceeds to (S599) and terminates.

The process (500) can be suitably adapted. Step(s) in the process (500) can be modified and/or omitted. Additional step(s) can be added. Any suitable order of implementation can be used.

The techniques described above, can be implemented as computer software using computer-readable instructions and physically stored in one or more computer-readable media. For example, FIG. 6 shows a computer system (600) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 6:
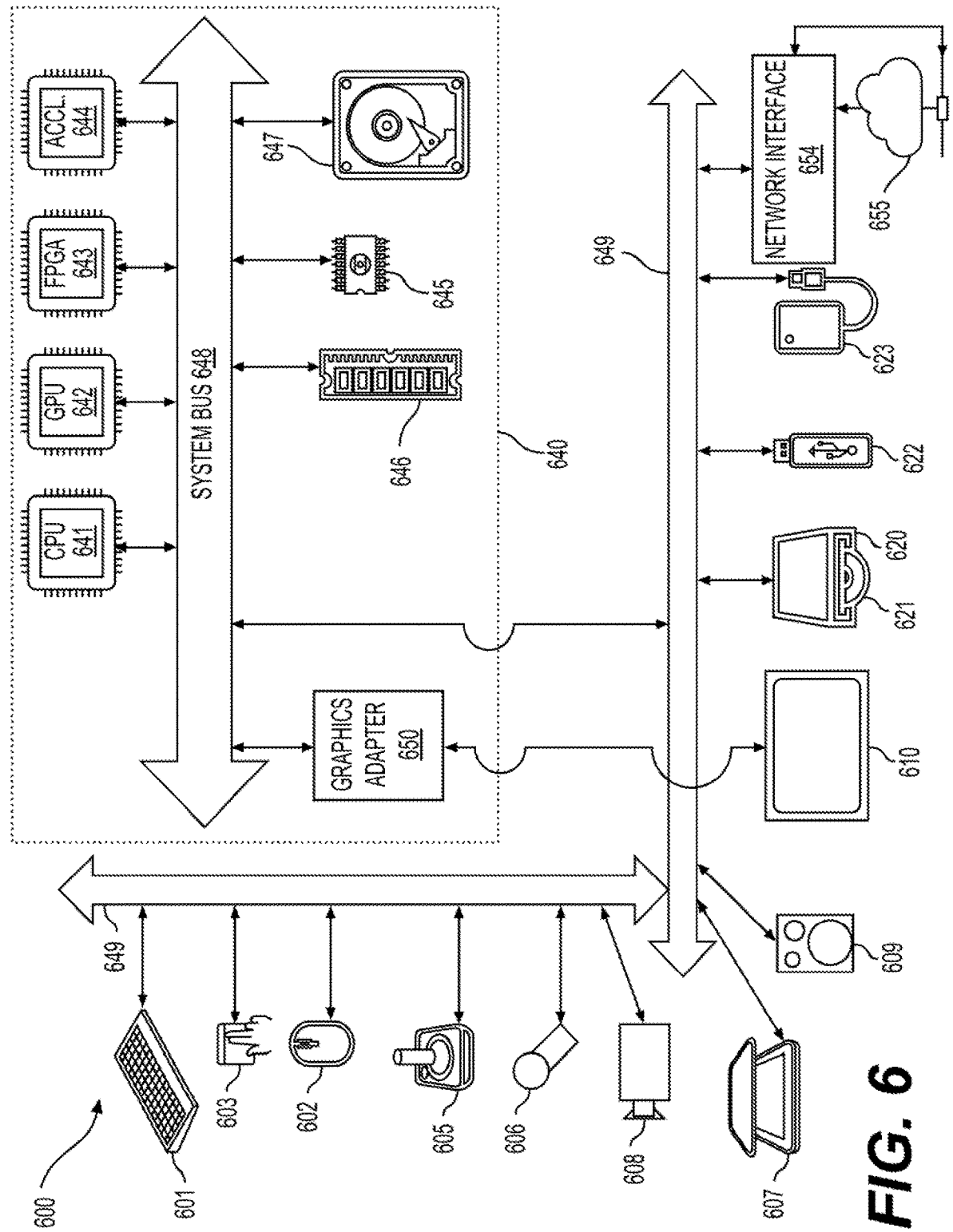
FIG. 6 is a schematic illustration of a computer system in accordance with an embodiment.

The components shown in FIG. 6 for computer system (600) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (600).

Computer system (600) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (601), mouse (602), trackpad (603), touch screen (610), data-glove (not shown), joystick (605), microphone (606), scanner (607), camera (608).

Computer system (600) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (610), data-glove (not shown), or joystick (605), but there can also be tactile feedback devices that do not serve as input devices), audio output devices (such as: speakers (609), headphones (not depicted)), visual output devices (such as screens (610) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (600) can also include human accessible storage devices and their associated media such as optical media including CD/DVD ROM/RW (620) with CD/DVD or the like media (621), thumb-drive (622), removable hard drive or solid state drive (623), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (600) can also include an interface (654) to one or more communication networks (655). Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (649) (such as, for example USB ports of the computer system (600)); others are commonly integrated into the core of the computer system (600) by attachment to a system bus as described below (for example Ethernet interface into a PC computer system or cellular network interface into a smartphone computer system). Using any of these networks, computer system (600) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (640) of the computer system (600).

The core (640) can include one or more Central Processing Units (CPU) (641), Graphics Processing Units (GPU) (642), specialized programmable processing units in the form of Field Programmable Gate Areas (FPGA) (643), hardware accelerators for certain tasks (644), graphics adapters (650), and so forth. These devices, along with Read-only memory (ROM) (645), Random-access memory (646), internal mass storage such as internal non-user accessible hard drives, SSDs, and the like (647), may be connected through a system bus (648). In some computer systems, the system bus (648) can be accessible in the form of one or more physical plugs to enable extensions by additional CPUs, GPU, and the like. The peripheral devices can be attached either directly to the core's system bus (648), or through a peripheral bus (649). In an example, the screen (610) can be connected to the graphics adapter (650). Architectures for a peripheral bus include PCI, USB, and the like.

CPUs (641), GPUs (642), FPGAs (643), and accelerators (644) can execute certain instructions that, in combination, can make up the aforementioned computer code. That computer code can be stored in ROM (645) or RAM (646). Transitional data can be also stored in RAM (646), whereas permanent data can be stored for example, in the internal mass storage (647). Fast storage and retrieve to any of the memory devices can be enabled through the use of cache memory, that can be closely associated with one or more CPU (641), GPU (642), mass storage (647), ROM (645), RAM (646), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (600), and specifically the core (640) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (640) that are of non-transitory nature, such as core-internal mass storage (647) or ROM (645). The software implementing various embodiments of the present disclosure can be stored in such devices and executed by core (640). A computer-readable medium can include one or more memory devices or chips, according to particular needs. The software can cause the core (640) and specifically the processors therein (including CPU, GPU, FPGA, and the like) to execute particular processes or particular parts of particular processes described herein, including defining data structures stored in RAM (646) and modifying such data structures according to the processes defined by the software. In addition or as an alternative, the computer system can provide functionality as a result of logic hardwired or otherwise embodied in a circuit (for example: accelerator (644)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

The use of "at least one of" or "one of" in the disclosure is intended to include any one or a combination of the recited elements. For example, references to at least one of A, B, or C; at least one of A, B, and C; at least one of A, B, and/or C; and at least one of A to C are intended to include only A, only B, only C or any combination thereof. References to one of A or B and one of A and B are intended to include A or B or (A and B). The use of "one of" does not preclude any combination of the recited elements when applicable, such as when the elements are not mutually exclusive.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method of mesh processing performed in a decoder, the method comprising:
   receiving coded information of a mesh that includes a plurality of vertices, the coded information including a plurality of first coordinates and a plurality of second coordinates corresponding to the plurality of vertices and a texture map that is associated with the mesh, the texture map indicating texture information of the mesh, each vertex of the plurality of vertices including a respective first coordinate and a respective second coordinate that in combination uniquely identify a position of the each vertex;
   normalizing a respective first coordinate associated with the plurality of vertices by a first divider in a first factor and a respective second coordinate associated with the plurality of vertices by a second divider in a second factor, the first factor and the second factor being associated with at least one of (i) a bit depth value indicating a coded range of the plurality of first coordinates and the plurality of second coordinates of the plurality of vertices and (ii) a size of the texture map;
   expanding the normalized respective first coordinate by a first multiplier in the first factor and the normalized respective second coordinate by a second multiplier in the second factor; and
   reconstructing the mesh based on the normalized and expanded respective first coordinate and the normalized and expanded respective second coordinate of the plurality of vertices of the mesh.

2. The method of claim 1, wherein:
   the normalizing comprises:
   dividing each of the plurality of first coordinates of the plurality of vertices by the first divider included in the first factor, and dividing each of the plurality of second coordinates of the plurality of vertices by the second divider included in the second factor; and the expanding comprises:

multiplying each of the normalized first coordinates of the plurality of vertices by the first multiplier included in the first factor, and multiplying each of the normalized second coordinates of the plurality of vertices by the second multiplier included in the second factor.

3. The method of claim 1, wherein:

the first factor is equal to (texwidth−1)/($2^{tqp}$−1), the texwidth being a width of the texture map, the tqp being the bit depth value indicating the coded range of the plurality of first coordinates and the plurality of second coordinates of the plurality of vertices, and the second factor is equal to (texheight−1)/($2^{tqp}$−1), the texheight being a height of the texture map.

4. The method of claim 1, wherein:

the first factor is a first fraction, each of the plurality of first coordinates being normalized by a denominator of the first fraction and expanded by a numerator of the first fraction, and the second factor is a second fraction, each of the plurality of second coordinates being normalized by a denominator of the second fraction and expanded by a numerator of the second fraction.

5. The method of claim 1, wherein:

when the size of the texture map is unavailable, both the first factor and the second factor are equal to ($2^{tdepth}$−1)/($2^{tqp}$−1), the tdepth being a bit depth value indicating an initial range of the plurality of first coordinates and the plurality of second coordinates of the plurality of vertices, the tqp being the bit depth value indicating the coded range of the plurality of first coordinates and the plurality of second coordinates of the plurality of vertices.

6. The method of claim 1, wherein:

the first factor is equal to (uMax/($2^{tqp}$−1)), the uMax being a first constant, the tqp being the bit depth value indicating the coded range of the plurality of first coordinates and the plurality of second coordinates of the plurality of vertices, and the second factor is equal to (vMax/($2^{tqp}$−1)), the vMax being a second constant.

7. The method of claim 6, wherein:

the uMax is equal to a width of the texture map minus one, and the vMax is equal to a height of the texture map minus one.

8. The method of claim 6, wherein:

when the size of the texture map is unavailable, both the uMax and the vMax are equal to $2^{tdepth}$ minus one, the tdepth being a bit depth value indicating an initial range of the plurality of first coordinates and the plurality of second coordinates of the plurality of vertices.

9. The method of claim 6, wherein both the uMax and the vMax are equal to $2^{tdepth}$ minus one, the tdepth being a bit depth value indicating an initial range of the plurality of first coordinates and the plurality of second coordinates of the plurality of vertices.

10. An apparatus for mesh processing, the apparatus comprising:

processing circuitry configured to:

receive coded information of a mesh that includes a plurality of vertices, the coded information including a plurality of first coordinates and a plurality of second coordinates corresponding to the plurality of vertices and a texture map that is associated with the mesh, the texture map indicating texture information of the mesh, each vertex of the plurality of vertices including a respective first coordinate and a respective second coordinate that in combination uniquely identify a position of the each vertex;

normalize a respective first coordinate associated with the plurality of vertices by a first divider in a first factor and a respective second coordinate associated with the plurality of vertices by a second divider in a second factor, the first factor and the second factor being associated with at least one of (i) a bit depth value indicating a coded range of the plurality of first coordinates and the plurality of second coordinates of the plurality of vertices and (ii) a size of the texture map;

expand the normalized respective first coordinate by a first multiplier in the first factor and the normalized respective second coordinate by a second multiplier in the second factor; and reconstruct the mesh based on the normalized and expanded respective first coordinate and the normalized and expanded respective second coordinate of the plurality of vertices of the mesh.

11. The apparatus of claim 10, wherein the processing circuitry is configured to:

divide each of the plurality of first coordinates of the plurality of vertices by the first divider included in the first factor to normalize the respective first coordinate;

divide each of the plurality of second coordinates of the plurality of vertices by the second divider included in the second factor to normalize the respective second coordinate;

multiply each of the normalized first coordinates of the plurality of vertices by the first multiplier included in the first factor to expand the normalized respective first coordinate; and multiply each of the normalized second coordinates of the plurality of vertices by the second multiplier included in the second factor to expand the normalized respective second coordinate.

12. The apparatus of claim 10, wherein:

the first factor is equal to (texwidth−1)/($2^{tqp}$−1), the texwidth being a width of the texture map, the tqp being the bit depth value indicating the coded range of the plurality of first coordinates and the plurality of second coordinates of the plurality of vertices, and the second factor is equal to (texheight−1)/($2^{tqp}$−1), the texheight being a height of the texture map.

13. The apparatus of claim 10, wherein:

the first factor is a first fraction, each of the plurality of first coordinates being normalized by a denominator of the first fraction and expanded by a numerator of the first fraction, and the second factor is a second fraction, each of the plurality of second coordinates being normalized by a denominator of the second fraction and expanded by a numerator of the second fraction.

14. The apparatus of claim 10, wherein:

when the size of the texture map is unavailable, both the first factor and the second factor are equal to ($2^{tdepth}$−1)/($2^{tqp}$−1), the tdepth being a bit depth value indicating an initial range of the plurality of first coordinates and the plurality of second coordinates of the plurality of vertices, the top being the bit depth value indicating the coded range of the plurality of first coordinates and the plurality of second coordinates of the plurality of vertices.

15. The apparatus of claim 10, wherein:
the first factor is equal to $(uMax/(2^{tqp}-1))$, the uMax being a first constant, the tqp being the bit depth value indicating the coded range of the plurality of first coordinates and the plurality of second coordinates of the plurality of vertices, and
the second factor is equal to $(vMax/(2^{tqp}-1))$, the vMax being a second constant.

16. The apparatus of claim 15, wherein:
the uMax is equal to a width of the texture map minus one, and
the vMax is equal to a height of the texture map minus one.

17. The apparatus of claim 15, wherein:
when the size of the texture map is unavailable,
both the uMax and the vMax are equal to $2^{tdepth}$ minus one, the tdepth being a bit depth value indicating an initial range of the plurality of first coordinates and the plurality of second coordinates of the plurality of vertices.

18. The apparatus of claim 15, wherein both the uMax and the vMax are equal to $2^{tdepth}$ minus one, the tdepth being a bit depth value indicating an initial range of the plurality of first coordinates and the plurality of second coordinates of the plurality of vertices.

19. A method of processing visual media data, the method comprising:
processing a bitstream of the visual media data according to a format rule, wherein:
the bitstream includes coded information of a mesh that includes a plurality of vertices, the coded information including a plurality of first coordinates and a plurality of second coordinates corresponding to the plurality of vertices and a texture map that is associated with the mesh, the texture map indicating texture information of the mesh, each vertex of the plurality of vertices including a respective first coordinate and a respective second coordinate that in combination uniquely identify a position of the each vertex; and
the format rule specifies that:
a respective first coordinate associated with the plurality of vertices is normalized by a first divider in a first factor and a respective second coordinate associated with the plurality of vertices is normalized by a second divider in a second factor, the first factor and the second factor being associated with at least one of (i) a bit depth value indicating a coded range of the plurality of first coordinates and the plurality of second coordinates of the plurality of vertices and (ii) a size of the texture map;
the normalized respective first coordinate is expanded by a first multiplier in the first factor and the normalized respective second coordinate is expanded by a second multiplier in the second factor; and
the mesh is processed based on the normalized and expanded respective first coordinate and the normalized and expanded respective second coordinate of the plurality of vertices of the mesh.

20. The method of claim 19, wherein the format rule specifies that:
each of the plurality of first coordinates of the plurality of vertices is divided by the first divider included in the first factor;
each of the plurality of second coordinates of the plurality of vertices is divided by the second divider included in the second factor;
each of the normalized first coordinates of the plurality of vertices is multiplied by the first multiplier included in the first factor; and
each of the normalized second coordinates of the plurality of vertices is multiplied by the second multiplier included in the second factor.

\* \* \* \* \*